United States Patent [19]
Leu

[11] Patent Number: 5,880,942
[45] Date of Patent: Mar. 9, 1999

[54] POWER SUPPLY DEVICE WITH LOW POWER DISSIPATION

[75] Inventor: Fang-Jye Leu, Taipei Hsien, Taiwan

[73] Assignee: Acer Peripherals Inc., Taiwan

[21] Appl. No.: 850,777

[22] Filed: May 2, 1997

[30]    Foreign Application Priority Data

Mar. 17, 1997 [TW] Taiwan ................................. 86103317

[51] Int. Cl.⁶ ............................. H02M 1/12; H02M 3/24; H02M 7/537
[52] U.S. Cl. ................................ 363/49; 363/97; 363/21; 363/131
[58] Field of Search ............................. 363/49, 20, 131, 363/21, 19, 56, 97; 323/901

[56]            References Cited

U.S. PATENT DOCUMENTS

| 4,370,701 | 1/1983 | Western .................................... 363/20 |
| 5,581,453 | 12/1996 | Ueta et al. ................................. 363/49 |

*Primary Examiner*—Peter S. Wong
*Assistant Examiner*—Rajnikant B. Patel
*Attorney, Agent, or Firm*—Pillsbury Madison & Sutro LLP

[57]            ABSTRACT

An improved power supply device decreases the amount of power used in computer and computer peripheral devices by utilizing a control transistor which is set into a switching operation responsive to a pulse signal received from a power supply control circuit. The control transistor controls the voltage applied to the primary winding of the power transformer by a switch transistor, and issues an output voltage from the secondary winding. The power supply device includes a switch circuit which is connected in series to a starting resistor for supplying the output voltage rectified from the AC power source when starting up to the power supply control circuit. The power supply device includes a switch-control circuit which turns off the switch circuit when the output voltage rectified from the AC output of the tertiary winding of the power transformer reaches a voltage high enough for stable operation of the power supply control circuit. The present invention is characterized by a separation device, coupled to the starting terminal of the power supply control circuit and the power source of the tertiary winding of the power transformer, to ensure that there is no need for an extremely high voltage to drive the switch-control circuit. As a result, the power loss at the starting resistor is eliminated after startup of the power supply device such that the power consumption of the power saving operation is also eliminated.

12 Claims, 4 Drawing Sheets

POWER SUPPLY DEVICE WITH LOW POWER DISSIPATION

BACKGROUND OF THE INVENTION

1. Field of the Invention

The present invention relates to a power supply device, and especially relates to a power supply device with low power dissipation and low fabrication cost, which utilizes a separation device to reduce voltage applied to a switch-control circuit.

2. Description of the Related Art

Recently, most computer products and their peripherals all utilize a so-called switching power supply whose center uses a pulse-width modulation control integrated circuit (IC) as a power supply control circuit. Generally speaking, this kind of pulse-width modulation control IC, for example, 3842 series and 3844 series, will not start until sufficient voltage or current is applied to it. So, it needs a startup circuit to put the IC into normal operation. After the IC is started, the energy needed by subsequent operations is supplied by a minor power supply (which is generated after the IC is started). Thereafter, the starting circuit becomes useless but nevertheless keeps on consuming power.

FIG. 1 shows a circuit diagram of a conventional switching power supply; a stabilizing control circuit is negligible. As shown in FIG. 1, a rectifier 1, such as a bridge rectifier, transforms an alternating-current (AC) voltage into a direct-current (DC) voltage; and a rectifying capacitor 2 smoothes the rectified DC voltage. The DC voltage flows through a starting resistor 3 to charge a starting capacitor 4 to start a power supply control circuit 5 (for example, a 3842 controller). After power supply control circuit 5 is started, a high-frequency pulse signal generated from the power supply control circuit 5 is transmitted to a gate of a control transistor 6 (for example, an NMOS). Then, the control transistor 6 begins a rapid switching operation. A power transformer 7 comprises: a primary winding 7a, a secondary winding 7b, and a tertiary winding 7c. The primary winding 7a is coupled to a drain of the NMOS transistor 6, and the secondary winding 7b and the tertiary winding 7c are respectively induced by the rapid switching operation of the NMOS transistor 6 and output a high-frequency pulse voltage. The induced high-frequency pulse voltage from the secondary winding 7b is rectified by an output diode 9 and smoothed by an output capacitor 10 to act as an output power source of the power supply. The induced high-frequency pulse voltage from the tertiary winding 7c is rectified by a auxiliary diode 8 and smoothed by the starting capacitor 4 to supply operational needs of the power supply control circuit 5.

The operations of the power supply are described below. When an AC voltage is fed to the power supply, the AC voltage is transformed into a DC voltage via the rectifier 1 and the rectifying capacitor 2. Then, the DC voltage flows through the starting resistor 3 to charge the starting capacitor 4. Along with an elevation of the DC voltage at terminal A, the DC voltage level at terminal B is also raised. When the voltage at terminal B reaches a specific level (for example, 16 V, in the case of a controller being a 3842 controller), the power supply control circuit 5 starts to output a high pulse signal (then, the voltage at terminal B will drop to 10 V~16 V). The control transistor 6 receives the high-frequency signal and begins a switching operation to transfer energy to the secondary winding 7b and the tertiary winding 7c. The high-frequency pulse voltage generated from the secondary winding 7b is rectified by an output diode 9 and smoothed by an output capacitor 10 to supply other circuits (not shown). The high-frequency pulse voltage generated from the tertiary winding 7c is rectified by an auxiliary diode 8 and smoothed by the starting capacitor 4 to supply the power supply control circuit 5.

That is, in the beginning when an AC voltage is fed to the power supply, the DC voltage which starts the power control circuit 5, flows through the starting resistor 3 to charge the starting capacitor 4. After the control transistor 6 begins the switching operation, a working voltage of the power supply control circuit 5 is supplied by the tertiary winding 7c of the power transformer 7. However, additional power dissipation occurs when current keeps flowing through the starting resistor 3. The power dissipation of the starting resistor 3 can be calculated as subsequent steps (in the case of the power supply control circuit being a 3842 controller).

Generally speaking, AC power supply by which computers and computer peripherals operate is between 90 V~160 V. When the AC input voltage is 90 V, i.e. the minimum input voltage, the DC voltage from rectifier 1 and rectifying capacitor 2 is about 90 V×1.414=126.7 V. A minimum starting current of a 3842 controller is 1 mA, so a maximum value of the starting resistor 3 is:(DC voltage-starting voltage)/1 mA=(127.26 V−16 V)/1 mA=111260Ω. When the AC input voltage is 264 V, i.e. the maximum input voltage, the DC voltage from the rectifier 1 and the rectifying capacitor 2 is about 264 V×1.414=373.296 V. After startup, a 3842 controller only needs a working voltage of 10 V. The power dissipation of the starting resistor 3 is (DC voltage-working voltage) $^2$/(the resistor of the starting resistor 3)=(373.296 V−10 V)$^2$/111260Ω=1.18 W. Since a power saving function, a required function of computers and computer peripherals, has a power dissipation of 5 W~8 W or less under off-mode, a power dissipation of 1.18 W is not negligible.

In order to reduce power consumed by the starting resistor 3, one of the prior art techniques shown in FIG. 2 has been disclosed in U.S. patent application Ser. No. 5,581,453. In FIG. 2, a switching circuit 11 is connected in series to a starting resistor 3 and a power supply control circuit 5. A switch-control circuit 12 controls the turning on and off of the switching circuit 11. Before the power supply control circuit 5 starts, the switching circuit 11 keeps turning on such that a DC current charges a starting capacitor 4 through a starting resistor 3 and provides a voltage level to start the power supply control circuit 5. After the power supply control circuit 5 starts, a rectified voltage of a tertiary winding 7c can raise a voltage level at terminal B to activate the switch-control circuit 12 and turn off the switching circuit 11. The starting resistor 3 can prevent additional power consumption after the power supply control circuit 5 starts.

According to the method shown in FIG. 2, a 3842 controller, the most common power supply control circuit, needs a startup voltage of 16 V, so the active voltage of the switch-control circuit 12 should be at least 16 V. If the activation of a switch-control circuit 12 opens the switching circuit 11 before the 3842 controller 5 completes startup, no DC current flows through the starting resistor 3 and the starting capacitor 4 is not charged. In this manner, the 3842 controller 5 will have difficulty starting. After the 3842 controller 5 starts, an output voltage from a tertiary winding 7c produces an activation of the switch-control circuit 12. The output voltage of the tertiary winding 7c should be raised. As a result, the number of windings in the tertiary winding 7c should be increased. However, various problems occur if the number of windings of the tertiary winding 7c is increased. For example, the fabrication cost and the power consumption of the transformer 7 will be increased. Also, raising the output voltage of the tertiary winding 7c places greater demands on the auxiliary diode 8, the starting capacitor 4, and the control transistor 6. As a result, the cost is increased. The problems become more severe when the power supply device has a higher starting voltage.

On the other hand, after a power supply control circuit has started, the voltage level of the output pulse signal is proportional to the voltage level at the starting terminal. After the starting of the 3842 controller, the voltage level at the starting terminal drops to between 10 V and 16 V. However, in the prior art shown in FIG. 2, in order to ensure a normal operation of the switch-control circuit 12, the voltage of the starting terminal of the 3842 controller should be minimally maintained above 16 V, higher than the voltage at the starting terminal of the 3842 controller. The voltage level of the output pulse signal is also raised. Selection of the MOS transistor requires a MOS transistor having a higher gate-source voltage ($V_{gs}$). The cost and the power consumption are also raised, especially when a power supply device having a high starting voltage is utilized.

In order to overcome disadvantages in the prior art, the present invention provides a power supply with low power consumption. In the present invention, a separation device is utilized to separate the starting voltage from the output voltage generated from the tertiary winding supplying a working voltage of a switch-control circuit. Even when the working voltage of the switch-control circuit is not raised, the switch-control circuit still operates normally. After a power supply device starts, the voltage at the starting terminal will not be affected by the output voltage from the tertiary winding. So a lower working voltage can maintain normal operation of the power supply control circuit. Hence, the fabrication cost and the power consumption are efficiently reduced.

SUMMARY OF THE INVENTION

In order to achieve the objectives stated above, the present invention provides a power supply device with low power consumption. The power supply device comprises: a DC voltage; a control transistor, receiving a switch signal and performing turn-on/turn-off operations; a power transformer, at least comprising a primary winding, a secondary winding, and a tertiary winding; wherein said DC voltage is applied to said primary winding-controlled by said control transistor, and said power transformer produces an output voltage in said secondary winding and said tertiary winding respectively; a power supply control circuit, when a voltage of a starting terminal of said power supply control circuit reaches a starting voltage level, said power supply control circuit is activated and outputs said switch signal to said control transistor; a path for said DC voltage to charge a starting capacitor thereby providing said starting voltage to said starting terminal for activating said power supply control circuit; a switch circuit, connected in series to said starting resistor and said power supply control circuit; a switch-control circuit, controlling the turning on/turn-off operations of said switch circuit, wherein when said output voltage of said tertiary winding reaches a specific voltage, said switch-control circuit will turn off said switch circuit to prevent additional power consumption by said starting resistor; and a separation device, coupled between said starting terminal of said power supply control circuit and said output terminal of said tertiary winding of said power transformer, to ensure that said switch-control circuit can be driven into turn-on operation by said specific voltage-which is lower than said starting voltage level.

DESCRIPTION OF THE DRAWINGS

Other objects, features, and advantages of the present invention will become apparent from the following detailed description made with reference to illustrative but non-limiting embodiments. The description is made with reference to the accompanying drawings, in which.

DESCRIPTION OF THE PREFERRED EMBODIMENT

First Embodiment

Figure 1:
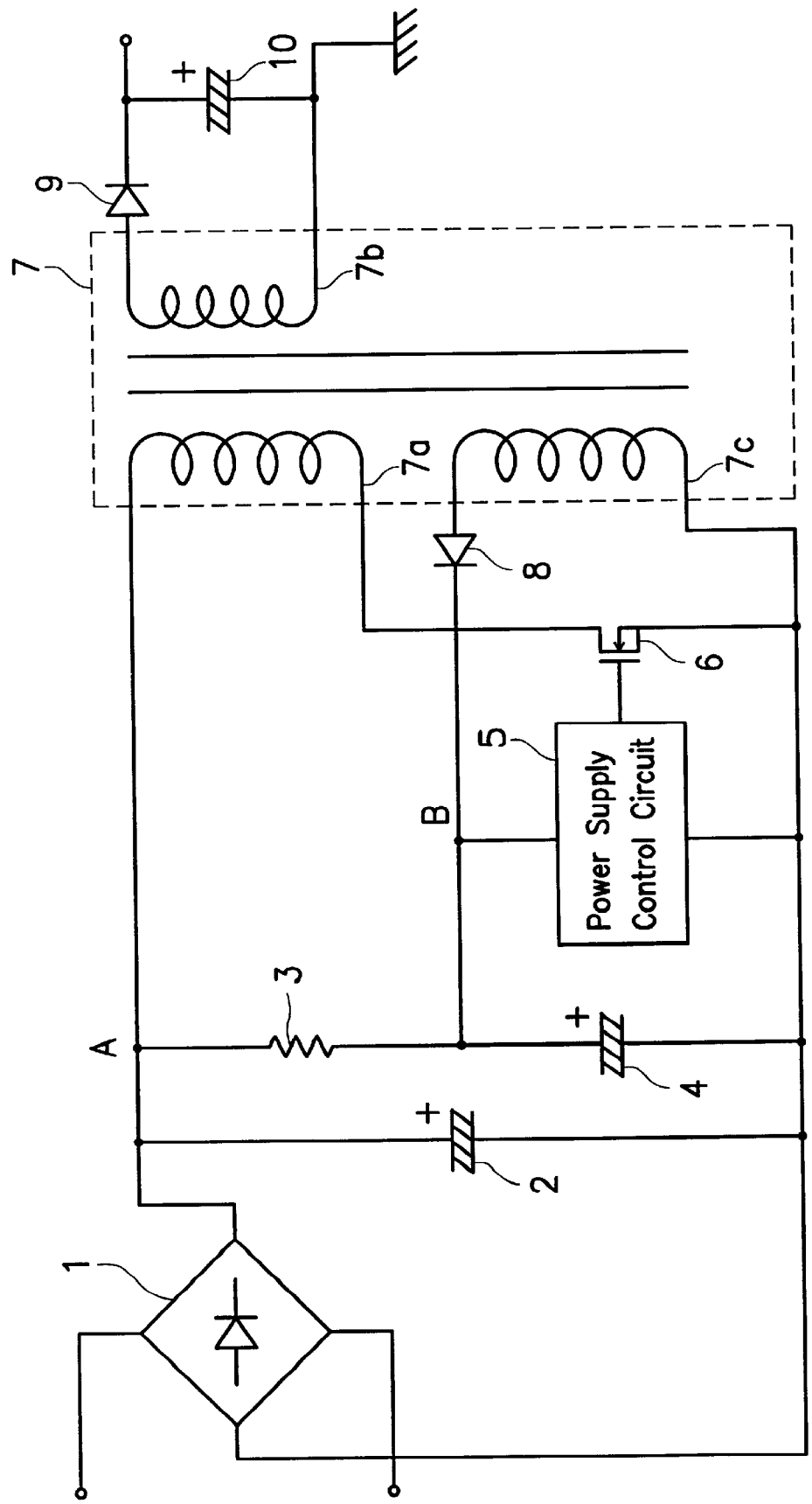
FIG. 1 shows a circuit diagram of a conventional switching power supply device.
Figure 2:
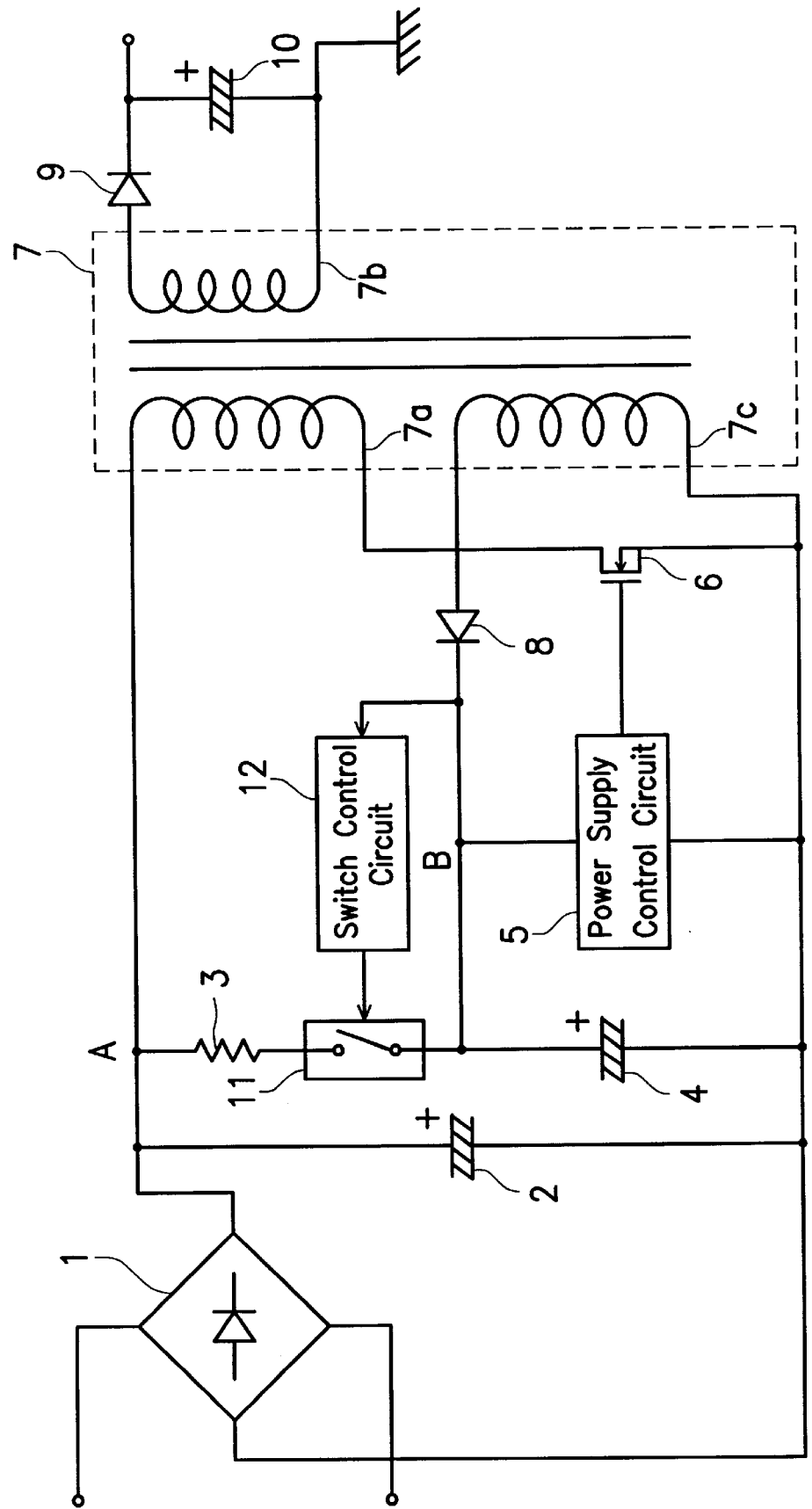
FIG. 2 shows a circuit diagram of a conventional switching power supply device which can reduce power consumed by a starting resistor.
Figure 3:
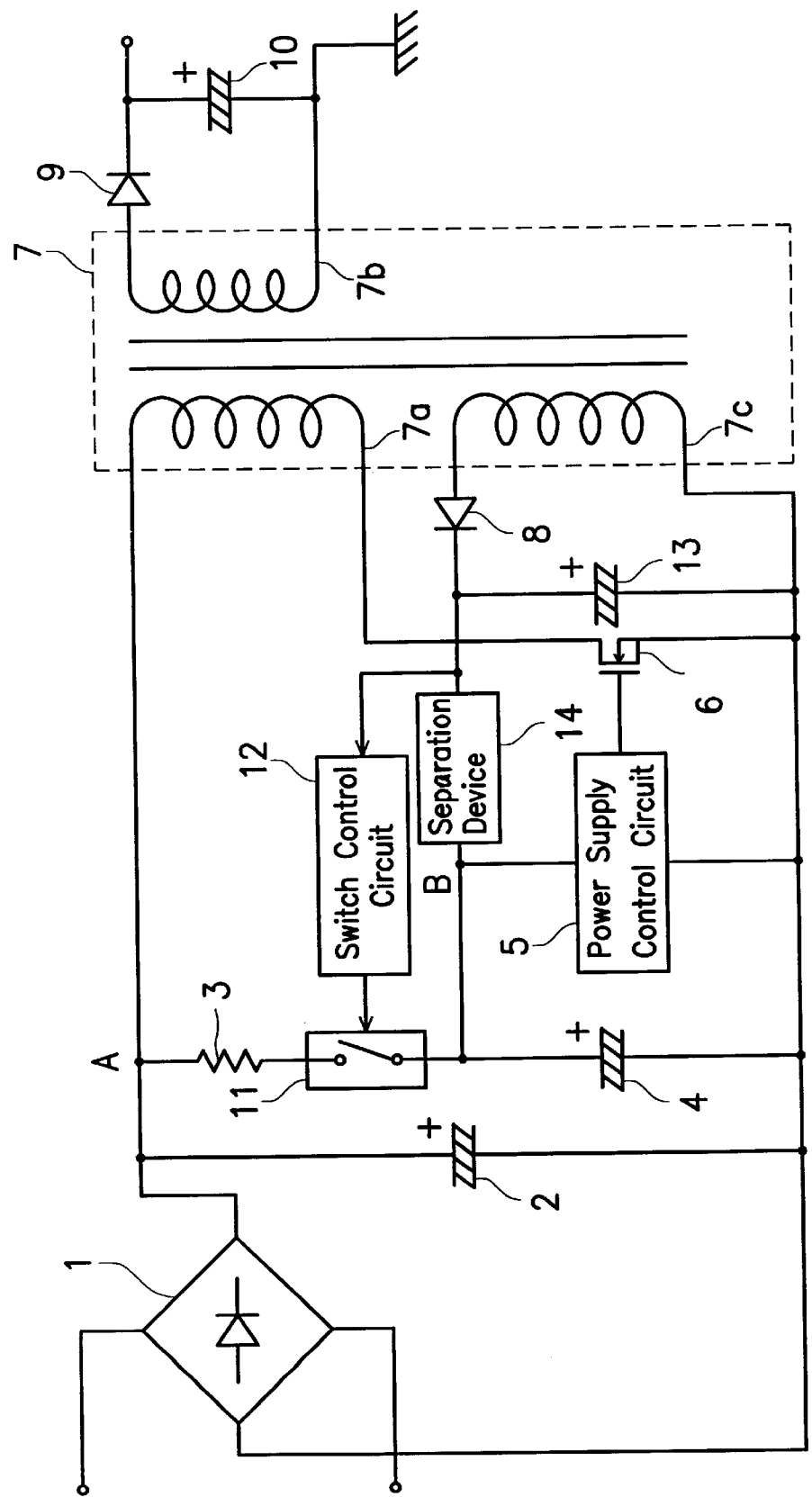
FIG. 3 shows a circuit diagram of a first embodiment according the present invention.

FIG. 3 shows a circuit diagram of a first embodiment according to the present invention where a stabilizing control circuit for stabilizing the output voltage is omitted. As shown in FIG. 3, a switch circuit 11 is connected in series to a starting resistor 3 and a power supply control circuit. A switch-control circuit 12 controls whether a switch circuit 11 is turned on or off. An output voltage, generated by a tertiary winding 7c of power transformer 7, rectified by an auxiliary diode 8 and an auxiliary capacitor 13, controls the operations of the switch-control circuit 12. A separation device 14 is coupled between a starting terminal B of a power supply control circuit 5 and a rectifying output terminal of the tertiary winding 7c. As a result, the switch-control circuit 12 operate normally at a working voltage no higher than a starting voltage of the power supply control circuit 5.

The operations of the power supply device are explained below. When an AC voltage is fed into the power supply, the AC voltage is transformed into a DC voltage via a rectifier 1 and a rectifying capacitor 2. At the beginning, the switch circuit turns on, so the DC voltage charges a starting capacitor 4 through a starting resistor 3. Along with an increase in the voltage at terminal A, the voltage at terminal B is also raised. When the voltage at terminal B reaches a specific voltage, the power supply control circuit will start and output a high-frequency pulse signal. The control transistor 6 receives the high-frequency pulse signal, and the pulse signal puts the control transistor 6 into switching operation to transfer energy into the secondary winding 7b and the tertiary winding 7c. The pulse voltage generated in the secondary winding 7b is rectified and smoothed by a diode 9 and an output capacitor 10, while a DC voltage is supplied to other circuits (not shown). The pulse voltage generated in the tertiary winding 7c is rectified and smoothed by an auxiliary diode 8 and an auxiliary capacitor 13 and a DC voltage reaches a specific voltage which activates the switch-control circuit 11 into operation and turns off switch circuit 11. The working voltage of the power supply control circuit 5 is supplied by the auxiliary capacitor 13, and no current flows through the starting resistor 3 thereby reducing additional power consumption. On the other hand, before the power supply control circuit 5 starts, the switch-control circuit 12 cannot be operating. So, switch circuit 11 keeps conducting in order to charge the starting capacitor 4 to a starting voltage. However, if no separation device 14 exists, the voltage stored in the auxiliary capacitor 13 must at least be higher than the starting voltage of the power supply control circuit 5 in order to put the switch-control circuit 12 into operation and to turn off the switch circuit 11. So, disadvantages of the prior art can be overcomed by application of the separation device 14.

Second embodiment

Figure 4:
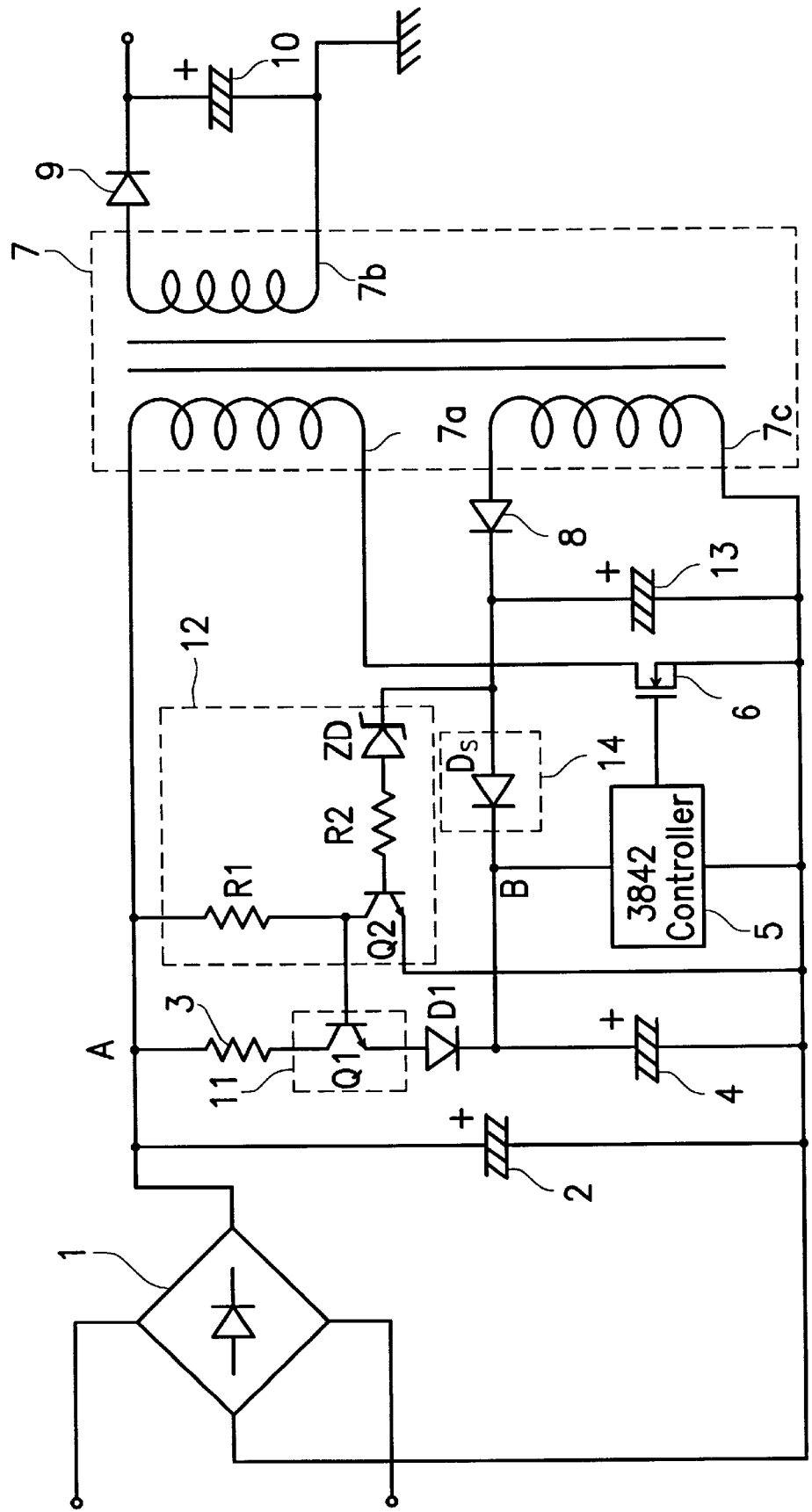
FIG. 4 shows a circuit diagram of a second embodiment according the present invention.

FIG. 4 shows a circuit diagram of a second embodiment of the present invention where a stabilizing control circuit for stabilizing the output voltage is omitted. In this embodiment, a pulse width modulation controller IC No. 3842 serves as a power supply control circuit 5. As shown in FIG. 4, a starting resistor 3 is connected in series to a first transistor Q1, a protection diode D1, and a 3842 controller 5. The base of the first transistor Q1 is connected to a first biasing resistor R1, and then to a DC voltage terminal A. A switch-control circuit 12, controlling the turning on and off of the first transistor Q1, comprises a second transistor Q2 (e.g., a PNP transistor), the first biasing resistor R1, a second biasing resistor R2, and a zener diode ZD. The second transistor Q2 comprises a collector, coupled to the base of the first transistor an emitter, coupled to a reference ground terminal of the 3842 controller 5 and a base, coupled to an anode of a separation diode Ds, serving as a separation device 14, via the second biasing resistor R2 and the zener diode ZD. The cathode of the separation diode is coupled to a starting terminal of the 3842 controller 5.

The operations of the power supply device are described below. At the beginning, the voltage on the auxiliary capacitor 13 is 0, so the second transistor Q2 is off. When an AC voltage is fed into the power supply device, the AC voltage is rectified by a rectifier 1 and a rectifying capacitor 2 into a DC voltage. The first biasing resistor R1 turns off the first transistor Q1. The DC voltage charges a starting capacitor 4 via a charging path made of a starting resistor 3, the first transistor Q1, and the protection diode D1. Along with an increase in the voltage at terminal A, the voltage at terminal B is also raised. When the voltage at terminal B reaches a specific voltage (e.g., about 16 V), the 3842 controller 5 will start and output a high-frequency pulse signal. A control transistor 6 receives the pulse signal and begins switching operation to transfer energy to a secondary winding 7b and a tertiary winding 7c. The pulse voltage generated from the secondary winding 7b is rectified and smoothed in an output diode 9 and an output capacitor 10 and a DC voltage is supplied to other circuits (not shown). The pulse voltage generated from the tertiary winding 7c is rectified and smoothed by an auxiliary diode 8 and charges an auxiliary capacitor 13. When the voltage of the auxiliary capacitor 13 reaches a specific voltage modified by the zener diode ZD and the second biasing resistor R2, the second transistor Q2 is turned on and the first transistor Q1 is turned off. In this manner no current flows through the starting resistor 3 and the working voltage of the 3842 controller 5 is supplied from the tertiary winding 7c of the power transformer 7. The protection diode D1 protects the base and the emitter of first transistor Q1 from damage caused by an extremely high reverse bias (about 16 V in this embodiment) when the second transistor Q2 is turned on.

The second transistor Q2 is off in the beginning when the AC voltage is fed into until that the voltage of the auxiliary capacitor 13 reaches a specific voltage. If the separation diode Ds is absent, the voltage of the auxiliary capacitor 13 should be at least 16 V to put the second transistor Q2 into operation before the 3842 controller 5 begins to start. To achieve this demand, the number of windings of the tertiary winding 7c must be increased. This places greater demands on the auxiliary diode 8, the auxiliary capacitor 13 and the control transistor 5, which in turn increase the cost. When applying a separation device of the present invention, the separation diode Ds is forward-set between the output terminal of the tertiary winding and the starting terminal. Before the 3842 controller starts, no output voltage is outputted from the tertiary winding 7c. The separation diode Ds is reverse-biased. The voltage at the starting terminal does not turn on the second transistor Q2 of the switch-control circuit 12. After startup, when the rectified output voltage from the tertiary winding 7c increases gradually to a specific threshold voltage, the second transistor Q2 turns on and no current flows through the starting resistor. The specific voltage can be much lower than 16 V. So, the voltage level of the rectified output of the tertiary winding 7c can be (10 V+Vf) which is sufficient for supplying the working voltage of the 3842 controller, wherein Vf is a forward bias of the separation diode Ds. After starting, the 3842 controller 5 only needs a working voltage of about 10 V. When a separation diode is applied, the 3842 controller 5 can operate under a voltage of about 10 V. An application of the separation diode Ds can reduce the operation voltage of the switch-control circuit, and drop the operation voltage of the 3842 controller 5 (about 10 V) to a degree which is much lower than that of the prior art (about 16 V). The output voltage level of the 3842 controller 5 can also be dropped by employing an NMOS transistor with a lower gate-source voltage that can serve as an NMOS control transistor 6 thereby reducing the component costs.

From the above discussion, it is known that the present invention utilizes a separation device located between a common terminal of a switch-control circuit and an output of a tertiary winding and a starting terminal of a power supply control circuit to overcome the disadvantages of the prior art. Advantages of the present invention are described below.

1. The voltage for turning on the switch-control circuit is reduced and a reduction in the number of windings of a power transformer also decreases the cost and power consumption. In addition, the lifetime of components of the switch-control circuit is increased because the voltage applied to the components is reduced.

2. The working voltage to start the power supply control switch is much lower than in the prior art, so the level of the output voltage of the power supply control circuit is lower than that of the prior art. The power consumption is reduced, and no more strenuous demands are placed on components as in the prior art. As a result, a control transistor of lower cost can be applied without affecting performance.

Having described the invention in connection with preferred embodiments, modifications will now doubtlessly be apparent to those skilled in this technology. The foregoing description of the preferred embodiments of the invention has been provided for the purposes of illustration and description only. It is not intended to be exhaustive or to limit the invention to the precise embodiment disclosed. The disclosed embodiment is chosen and described to best explain the principles of the invention and its practical application, thereby enabling others skilled in this technology to understand the invention, to practice various other embodiment thereof and to make various modifications suited to the particular use contemplated of the present invention. As such, it is intended that the scope of this invention shall not be limited to the disclosed, but rather it is to be defined by the following claims and their equivalents.

What is claimed is:

1. A power supply device with low power dissipation, comprising:

a DC voltage;

a control transistor, receiving a switching signal and performing turn-on/turn-off operations;

a power transformer, including at least a primary winding, a secondary winding, and a tertiary winding, for producing an output voltage in said secondary winding and said tertiary winding, respectively, when said DC voltage is applied to said primary winding controlled by said control transistor;

a power supply control circuit, activated when a voltage of a starting terminal of said power supply control circuit reaches a starting voltage level for outputting said switching signal to said control transistor;

a path for said DC voltage to charge a starting capacitor and provide said starting voltage to said starting terminal through a starting resistor, in order to activate said power supply control circuit;

a switch circuit, connected in series to said starting resistor and said power supply control circuit;

a switch-control circuit, including an input terminal coupled to said output voltage of tertiary winding controlling the turn-on/turn-off operations of said switch circuit, wherein said switch-control circuit turns off said switch circuit to prevent additional power consumption by said starting resistor when said output voltage of tertiary winding reaches a specific threshold voltage; and a separation device, coupled between said starting terminal of said power supply control circuit and said input terminal of said switch-control circuit, to ensure that said switch-control circuit will not be activated to turn off said switch circuit by said starting voltage which is higher than said specific threshold voltage of tertiary winding.

2. The power supply device of claim 1, wherein said separation device is a diode having an anode coupled to said switch-control circuit and an output terminal of said tertiary winding of said power transformer, and a cathode coupled to said starting terminal of said power supply control circuit.

3. The power supply device of claim 1, wherein said switch circuit includes a first transistor having a collector coupled to a terminal of said starting resistor, an emitter coupled to said starting terminal of said power supply control circuit, and a base coupled to said switch-control circuit and said switch-control circuit includes a second transistor having a collector coupled to said base of said first transistor and coupled to said DC voltage source via a biased diode, an emitter coupled to a reference ground terminal of said power supply control circuit, and a base coupled to an output voltage source of said tertiary winding of said power transformer providing a base current to said base of said second transistor.

4. The power supply device of claim 3, wherein IC 3842 series or 3844 series can serve as said power supply control circuit.

5. The power supply device of claim 4, further including a protective; forward-biased diode between said emitter of said first transistor and said starting capacitor.

6. The power supply device of claim 4, wherein said separation device is a diode having an anode coupled to said switch-control circuit and said output voltage source of said tertiary winding of said power transformer, and a cathode coupled to said starting terminal of said power supply control circuit.

7. The power supply device of claim 6, further including a protective; forward-biased diode between said emitter of said first transistor and said starting capacitor.

8. The power supply device of claim 3, wherein said separation device is a diode having an anode coupled to said switch-control circuit and said output voltage source of said tertiary winding of said power transformer, and a cathode coupled to said starting terminal of said power supply control circuit.

9. The power supply device of claim 8, further including a protective; forward-biased diode between said emitter of said first transistor and said starting capacitor.

10. The power supply device of claim 3, further including a protective; forward-biased diode between said emitter of said first transistor and said starting capacitor.

11. The power supply device of claim 1, wherein IC 3842 series or 3844 series can serve as said power supply control circuit.

12. The power supply device of claim 11, wherein said separation device is a diode having an anode coupled to said switch-control circuit and said output voltage source of said tertiary winding of said power transformer, and a cathode coupled to said starting terminal of said power supply control circuit.

* * * * *